US009320346B2

(12) United States Patent
Iannello et al.

(10) Patent No.: US 9,320,346 B2
(45) Date of Patent: Apr. 26, 2016

(54) ATTACHMENT STRAP

(75) Inventors: Christopher A. J. Iannello, Glenview, IL (US); Martin J. Nilsen, Glenview, IL (US); Michael B. Grimm, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 182 days.

(21) Appl. No.: 14/235,047

(22) PCT Filed: Jul. 26, 2012

(86) PCT No.: PCT/US2012/048256
§ 371 (c)(1),
(2), (4) Date: Jan. 25, 2014

(87) PCT Pub. No.: WO2013/016489
PCT Pub. Date: Jan. 31, 2013

(65) Prior Publication Data
US 2015/0321813 A1    Nov. 12, 2015

Related U.S. Application Data

(60) Provisional application No. 61/512,045, filed on Jul. 27, 2011.

(51) Int. Cl.
*B65D 63/10* (2006.01)
*A45F 5/02* (2006.01)
*F16L 3/233* (2006.01)
*A45F 5/00* (2006.01)

(52) U.S. Cl.
CPC .............. *A45F 5/02* (2013.01); *B65D 63/1063* (2013.01); *F16L 3/2332* (2013.01); *A45F 2005/006* (2013.01); *B65D 2563/106* (2013.01); *B65D 2563/107* (2013.01); *Y10T 24/13* (2015.01)

(58) Field of Classification Search
CPC . Y10T 24/1498; Y10T 24/141; Y10T 24/153; Y10T 292/496; Y10T 24/14; Y10T 24/1402; Y10T 24/1408; Y10T 24/3404; Y10T 24/3444; Y10T 292/499; Y10T 292/50; B65D 63/1063; B65D 63/1072; B65D 2563/106; B65D 2563/107; B65D 63/1081; F16L 3/137; F16L 3/233; F16L 3/2334; F16L 3/2332; F16L 3/2336; A61M 2025/024; A61M 2025/026; A61M 25/02; H02G 3/26; Y10S 128/06
USPC ... 24/16 PB, 16 R, 17 AP, 17 B, 17 R, 30.5 P, 24/309, 339; 248/74.3, 73
See application file for complete search history.

(56) References Cited

U.S. PATENT DOCUMENTS 2,979,794 A * 4/1961 De Bartolo ........ B65D 63/1063
                                                24/16 PB
D205,659 S  * 9/1966 Piasecki ............. B65D 63/1063
                                                24/16 PB (Continued)

FOREIGN PATENT DOCUMENTS

WO        2010/034148 A1    4/2010

OTHER PUBLICATIONS

ISR and WO for PCT/US2012/048256 mailed Oct. 23, 2012.

*Primary Examiner* — David Upchurch (57) ABSTRACT

An attachment strap incorporating an elongated strap segment extending away from an attachment head. The attachment head includes a crossbar extending between raised lateral sidewalls. The strap may be passed under the crossbar between the lateral sidewalls. The strap segment includes an array of raised or lowered profile elements disposed at positions along the length. The crossbar includes a complementary raised or lowered profile element adapted to matedly engage the strap profile elements in reversible inserted relation and to hold the strap in place within the attachment head following insertion of the strap behind the crossbar.

20 Claims, 7 Drawing Sheets

(56) References Cited

U.S. PATENT DOCUMENTS

| | | | | |
|---|---|---|---|---|
| 3,537,146 A | * | 11/1970 | Caveney | B65D 63/1072 24/16 PB |
| 3,855,669 A | | 12/1974 | Meyer | |
| 4,287,644 A | * | 9/1981 | Durand | F16L 3/2334 24/16 PB |
| 4,728,064 A | * | 3/1988 | Caveney | B65D 63/1081 24/16 PB |
| 4,866,816 A | * | 9/1989 | Caveney | F16L 3/233 24/16 PB |
| 5,267,967 A | * | 12/1993 | Schneider | A61M 25/02 128/DIG. 6 |
| 5,669,111 A | * | 9/1997 | Rohaly | B65D 63/1072 24/16 PB |
| 6,640,394 B1 | * | 11/2003 | Berrocal | B65D 63/1063 24/16 PB |

* cited by examiner

ATTACHMENT STRAP

CROSS REFERENCE TO RELATED APPLICATIONS

The present application is a U.S. National Phase entry of International Application Number PCT/US2012/048256 filed Jul. 26, 2012, which claims priority to U.S. Provisional Application No. 61/512,045 filed 27 Jul. 2011. The contents of such prior application and all other documents referenced in this application are hereby incorporated by reference in their entirety as if fully set forth herein.

FIELD OF THE DISCLOSURE

The present disclosure relates generally to straps and ties for connecting articles to one another or holding articles in place. More particularly, the disclosure is directed to pliable straps for releasably securing articles to one another through use of an elongate strap segment which loops back upon itself and connects in releasable locking relation to hold articles in place relative to one another. The pliable straps of the present disclosure may find particular application in use with so called "MOLLE" load distribution systems for attachments of articles to vests and the like by hikers and other users.

BACKGROUND

Attachment straps or ties have long been used to bind items together and are generally known to those of skill in the art. Such attachment elements typically include an elongated strap portion that loops around one or more articles and connects back to itself in a cinch-like manner. Many prior ties are not reversible after tightening and cannot be readily adjusted. While some attachment straps are reversible and can be adjusted, such constructions may require the use of tools for removal and/or may have relatively limited adjustability. Such characteristics may make the prior known attachment straps undesirable for applications such as joining auxiliary articles to base articles such as belts, vests, backpacks and the like where substantial adjustability and ease of reversal may be desirable.

In light of the above deficiencies in the prior art, there remains a need for a highly adjustable and reversible attachment strap suitable to attach auxiliary articles such as tools, pouches and the like to base articles such as belts, vests, backpacks and the like.

SUMMARY OF THE DISCLOSURE

In one exemplary construction the present disclosure provides advantages and alternatives over the prior art by providing an attachment strap incorporating an elongated strap tail extending away from an attachment head. The attachment head includes a crossbar extending between raised lateral sidewalls. The tail may be passed under the crossbar between the lateral sidewalls. The tail includes a stacked array of raised or lowered profile elements disposed at positions along the length. The crossbar includes a complementary raised or lowered profile element adapted to matedly engage the tail profile elements in reversible mating relation and to hold the tail in place within the attachment head following insertion of the strap behind the crossbar.

In accordance with one exemplary aspect, the present disclosure provides an attachment strap of elongated geometry adapted for insertion through a webbing loop on a base article worn by a user. The attachment strap includes a polymeric molded attachment head including a base frame with a pair of lateral sidewalls projecting in raised relation away from the base frame. The attachment head includes a crossbar extending between the lateral sidewalls in raised relation to the base frame such that there is a space between the crossbar and the base frame. The crossbar includes at least one raised or depressed crossbar profile element oriented in facing relation towards the base frame. A pliable tail segment of polymeric molded construction extends away from the attachment head. The tail segment is foldable upon itself to form a loop. The tail segment includes a distal portion adapted for sliding insertion under the crossbar and between the lateral sidewalls such that the distal portion of the tail segment is disposed between the crossbar and the base frame. The distal portion of the tail segment includes a stacked series of spaced apart raised or depressed tail segment profile elements facing in the same direction as the crossbar profile element when the tail segment is in a flat unfolded condition. The tail segment profile elements have a geometry complementary to the crossbar profile element and are mateable in reversible inserted relation to the crossbar profile element such that the distal portion of the tail segment may be held in place relative to the crossbar following sliding insertion of the distal portion under the crossbar.

Other features and advantages of the disclosure will become apparent to those of skill in the art upon review of the following detailed description, claims and drawings.

Before the exemplary embodiments of the disclosure are explained in detail, it is to be understood that the disclosure is in no way limited in its application or construction to the details and the arrangements of the components set forth in the description or illustrated in the drawings. Rather, the disclosure is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views. An exemplary attachment strap 10 consistent with the present disclosure is illustrated schematically in FIGS. 1 and 2. As shown, the exemplary attachment strap 10 includes an attachment head 12 with an elongated pliable tail segment 14 extending away from the attachment head 12. As shown, the tail segment 14 may include an intermediate section 15 of reduced thickness to promote folding if desired. However, a uniform thickness along the length may likewise be used. The attachment strap 10 may be formed from a suitable polymer or combination of polymers using techniques such as single shot or multiple shot injection molding or the like such that the attachment head 12 and the tail segment 14 are integral with one another. By way of example only, and not limitation, the attachment strap 10 may be formed as a unitary construction from a polymer or copolymer such as nylon, polyester, polypropylene or the like.

Figure 1:
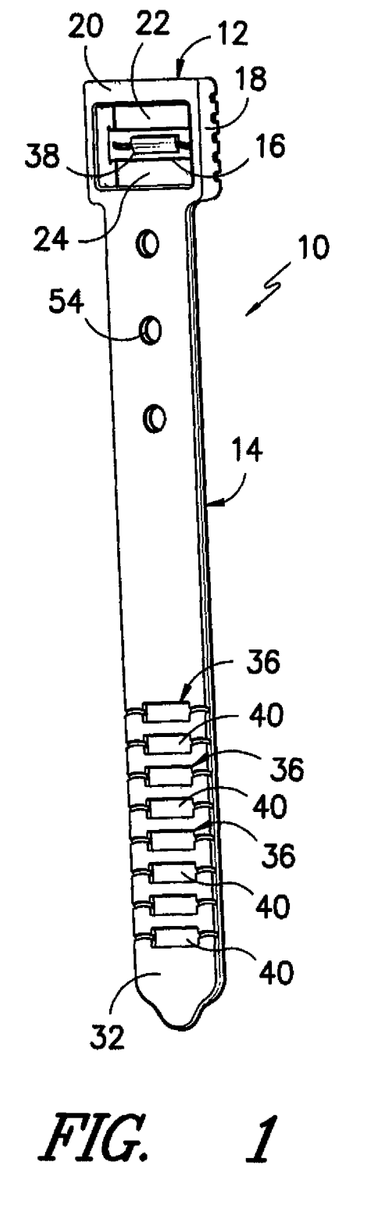
FIG. 1 is a schematic plan view illustrating the back face of one embodiment of an exemplary attachment strap consistent with the present disclosure.
Figure 2:
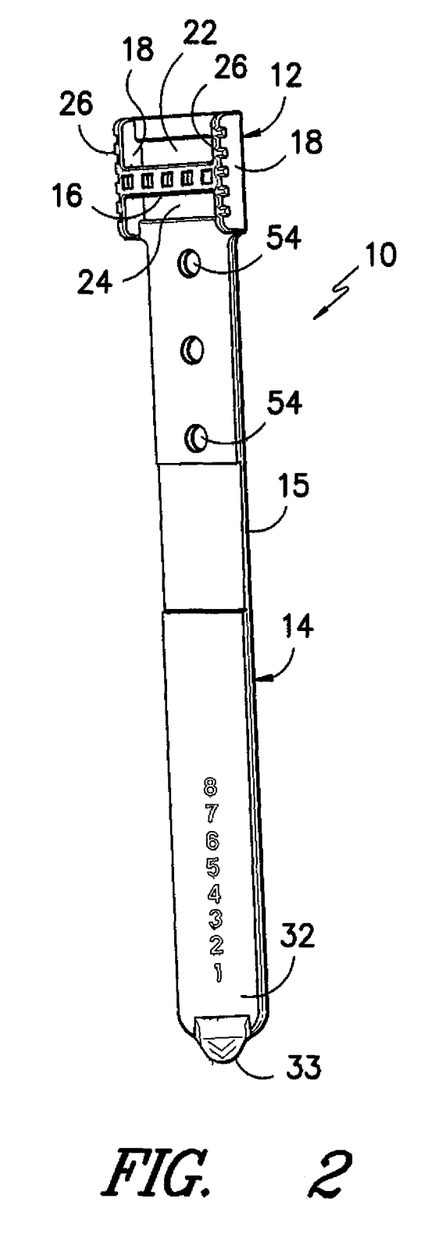
FIG. 2 is a schematic plan view illustrating the front face of the exemplary attachment strap illustrated in FIG. 1.

As seen through joint reference to FIGS. 1 and 2, the attachment head 12 may have a substantially "U" shaped cross section with a crossbar 16 extending between raised lateral sidewalls 18. Accordingly, in the illustrated construction, the base frame 20 and the lateral sidewalls 18 cooperatively form a generally "U" shaped cross section. In the exemplary construction, the crossbar 16 is disposed in slightly raised relation to a base frame 20 surrounding a window opening across the back of the attachment head 12 such that the crossbar 16 defines an offset barrier separating the window opening into an upper eyelet 22 and a lower eyelet 24. As shown, the lateral sidewalls 18 project outwardly away from the sides of the base frame 20 to define the sides of the "U" shaped cross section. In the illustrated exemplary construction, the free edges 26 of the lateral sidewalls may incorporate a serrated surface to assist a user in gripping the head. However, a flat surface also may be used.

Figure 5:
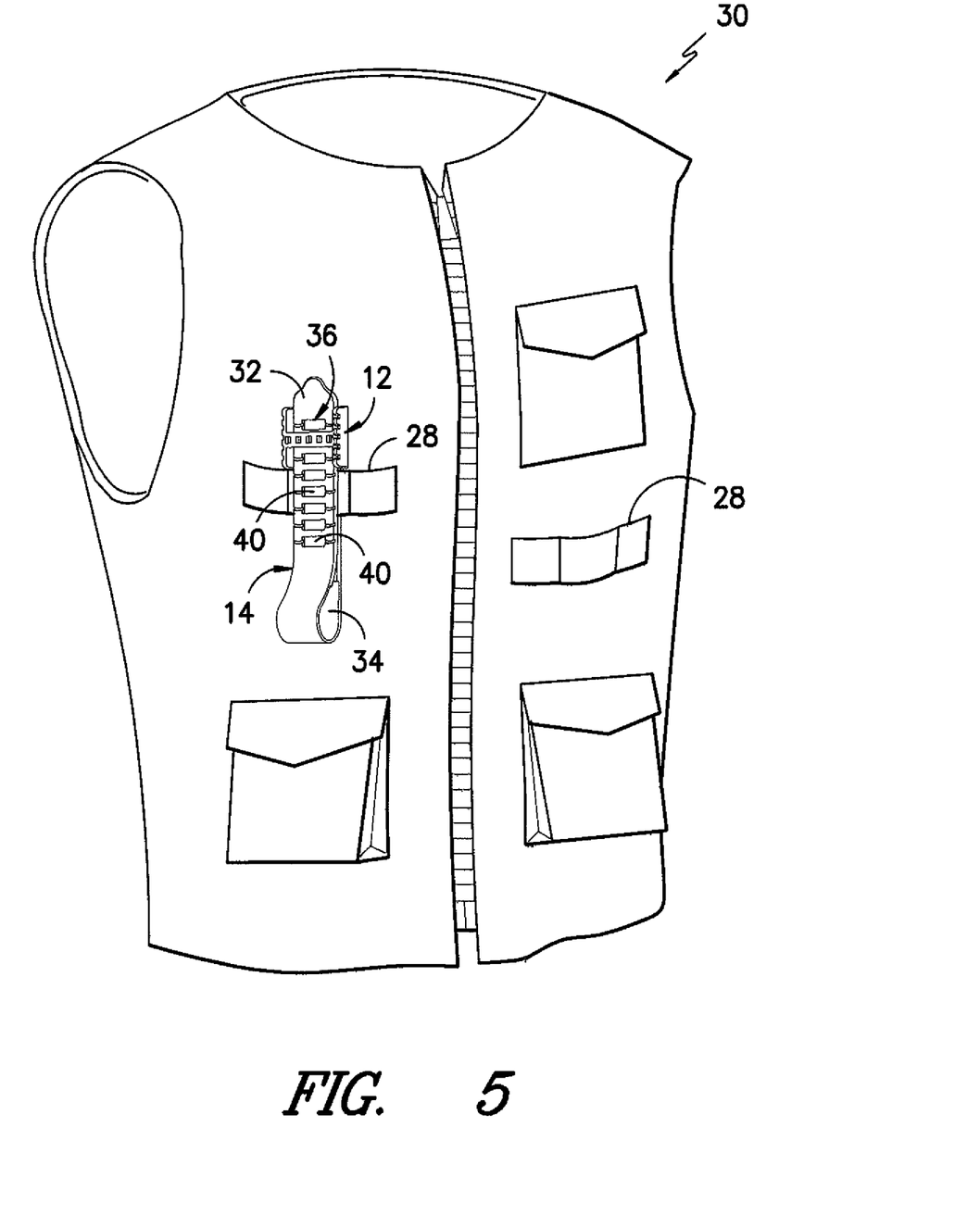
FIG. 5 is a schematic view illustrating an exemplary vest with surface webbing adapted to engage an attachment strap consistent with the present disclosure.
Figure 6:
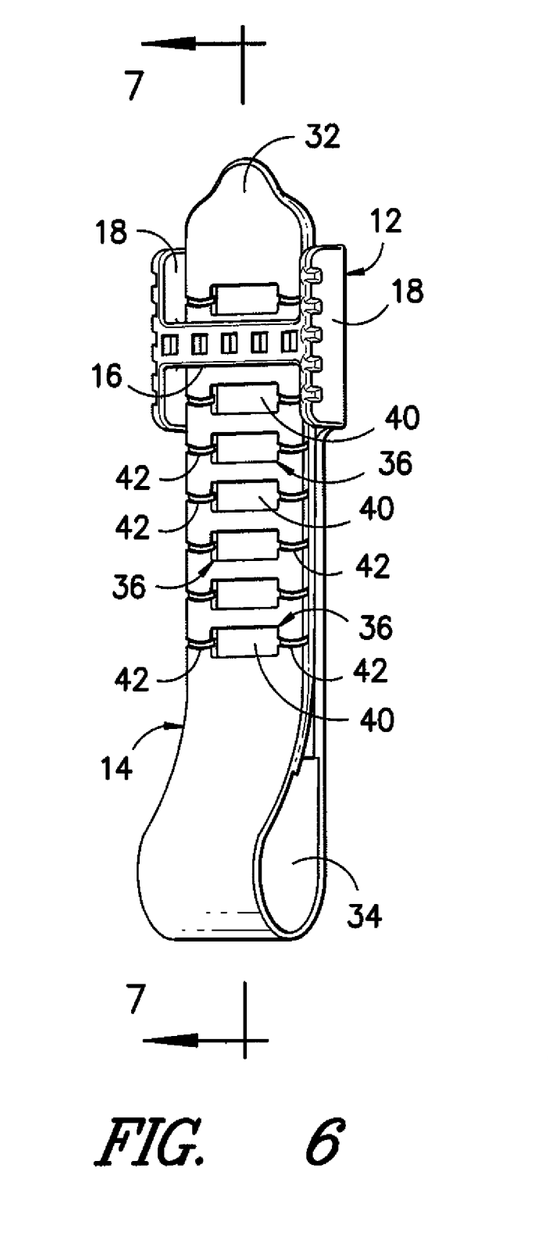
FIG. 6 is a schematic view illustrating the front of the attachment head of the attachment strap of FIGS. 1 and 2 with the distal end of the tail segment inserted under the crossbar of the attachment head.
Figure 7:
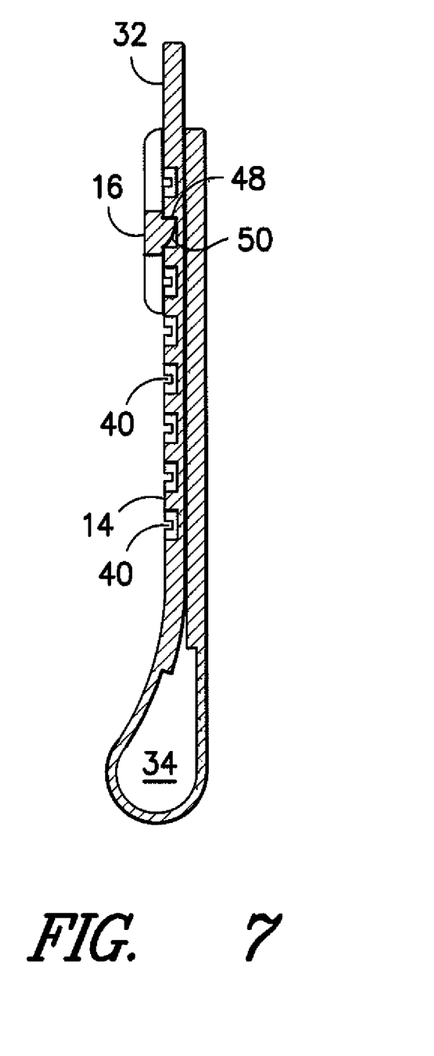
FIG. 7 is a schematic cross-sectional view taken generally through line 7-7 in FIG. 6 illustrating an exemplary press-fit locking engagement between the attachment head and the tail segment.

As best seen through joint reference to FIGS. 5-7, in use, the tail segment 14 may be passed behind a belt or through a loop of a webbing member 28 on a base article 30 such as a vest, a backpack or the like (FIG. 5). The attachment head 12 is preferably sized to be slightly wider than the tail segment so as to be blocked from passage through the loop of the webbing member 28. Thus, the attachment strap may be inserted into the webbing loop and carried therein without fear of loss. In this regard, while only a single webbing member 28 is illustrated on each side of the base article 30, multiple stacked webbing members such as are used in so called "MOLLE" systems as will be well known to those of skill in the art also may be used.

As best seen in FIGS. 6 and 7, during use the tail segment 14 may be looped upon itself such that the distal end 32 may be passed behind the crossbar 16 and between the lateral sidewalls 18 (FIG. 6). As illustrated, the distal end 32 may include a molded-in lead-in tab 33 having a pointed or narrowed width geometry so as to facilitate lead-in during insertion (FIG. 2). As shown, the lead-in tab may include surface ridges to facilitate gripping by a user. In the final inserted relation, a portion of the tail segment 14 will be disposed between the crossbar 16 and the base frame 20. Thus, the lateral sidewalls 18 define the edges of a channel track such that the inserted portion of the tail segment 14 is held beneath the crossbar 16 and between the lateral sidewalls 18 (FIG. 6).

As will be readily understood, with the distal end 32 held in place within the attachment head, the tail segment forms a loop 34. In the illustrated exemplary construction, this loop 34 may encompass the reduced thickness intermediate section 15 as described previously. It is to be understood that for ease of understanding and illustration, the loop 34 formed by the tail segment 14 is illustrated as being empty. However, in actual practice, this loop may be used to engage an article such as a pouch, piece of equipment or the like to be carried by the user. Moreover, multiple attachment straps 10 may be used together to engage one or more articles to be carried. The use of such multiple attachment straps has the generally beneficial result of spreading the load across an extended area thereby reducing the fatigue of the user carrying the articles.

As best seen through joint reference to FIGS. 1, 3, 6 and 7, in order to secure the looped arrangement in place, in the illustrated exemplary construction, the tail segment 14 includes a series of molded-in depressed tail profile elements 36 arranged in stacked series in spaced-apart relation along a distal portion of the tail segment 14. As best seen in FIGS. 1, 4, and 7, in the exemplary construction, the crossbar 16 includes a complementary raised crossbar profile element 38 adapted to matedly engage any of the depressed tail profile elements 24 in attached mating relation. In this regard, it is to be understood that while in the illustrated and potentially preferred arrangement, the tail profile elements 36 have a molded-in depressed profile (i.e. are sunken) and the crossbar profile element 38 has a complementary raised profile, this arrangement may be reversed if desired.

Figure 3:
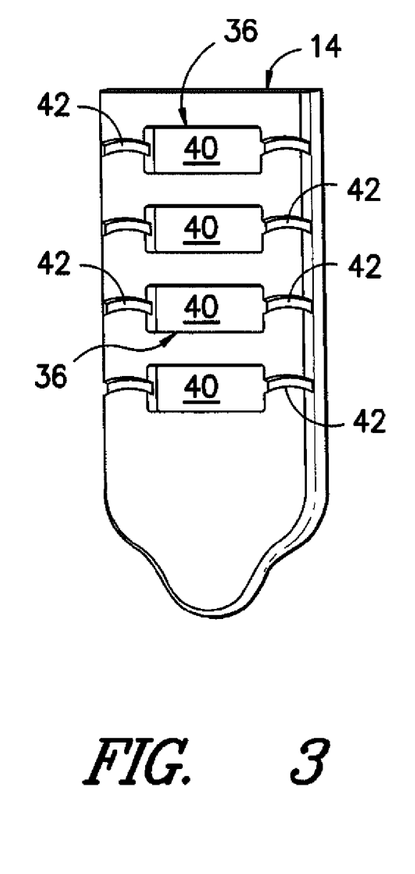
FIG. 3 is a schematic view illustrating the back side of the distal end of the tail segment of the exemplary attachment strap illustrated in FIGS. 1 and 2.
Figure 4:
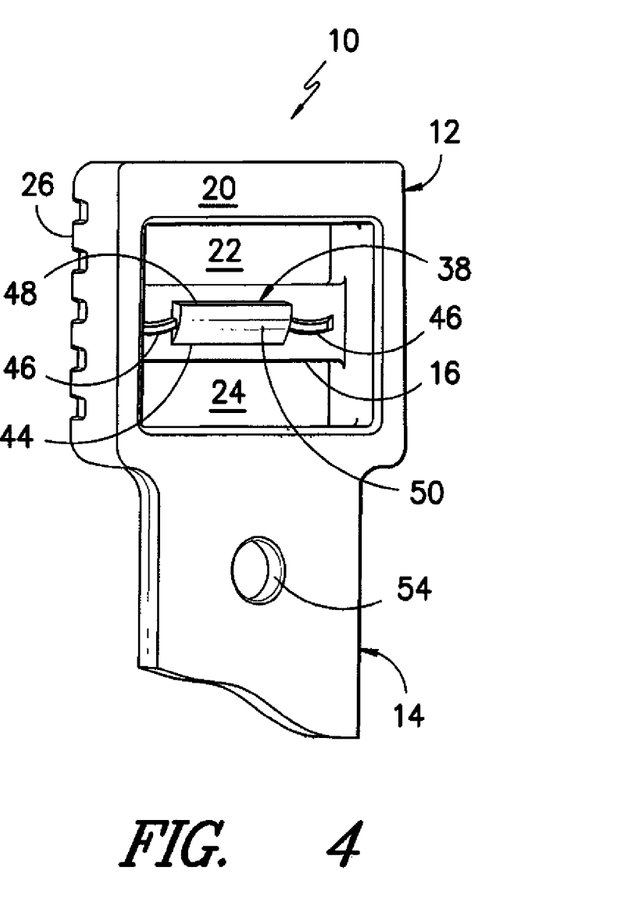
FIG. 4 is a schematic view illustrating the back of the attachment head of the exemplary strap illustrated in FIGS. 1 and 2.

As best illustrated in FIGS. 3 and 6, in the exemplary construction, the depressed tail profile elements 36 may have a central pocket 40 with perimeter curved pockets 42 intersecting and extending away from lateral sides of the central pocket 40. The central pocket 40 and the perimeter curved pockets 42 may be part of a single unitary depression formed during the molding process. As seen through joint reference to FIGS. 1 and 4, in the exemplary construction, the raised crossbar profile element 38 includes a central tooth 44 with perimeter wave shaped teeth 46 extending away from lateral edges of the central tooth 34 towards the lateral sidewalls 18. The central tooth 44 with perimeter wave shaped teeth 46 may be part of a single unitary raised profile structure formed during the molding process. As shown, in the exemplary construction the perimeter wave shaped teeth 46 extend partially but not completely to the lateral sidewalls 18.

As illustrated in the various views, in the exemplary construction the central tooth 44 may have a substantially pyramidal geometry with a triangular or trapezoidal cross section. As best seen in FIGS. 4 and 7, in the exemplary configuration, the central tooth 44 includes a substantially planar upper ledge surface 48 projecting at substantially right angles away from the back face of the crossbar 16 towards the plane defined by the base frame 20. An angled face 50 extends downwardly and away from the upper ledge surface 48 to define a camming ramp. In the exemplary construction, each of the perimeter wave shaped teeth 46 may have a substantially hemispherical cross section and is oriented with a generally concave curvature pattern with the apex of the curve projecting substantially downwardly in the direction of the tail segment 14 such that the ends of the wave shaped teeth are higher than the middle. However, other curvature patterns may likewise be used.

The central tooth 44 preferably projects a distance away from the surface of the crossbar 16 so as to slidingly engage the opposing surface of the tail segment 14 during insertion under the crossbar 16. Moreover, the central tooth 44 preferably is configured for mating insertion into any one of the central pockets 40 of the depressed tail profile elements 38. Likewise, the perimeter wave shaped teeth 46 are preferably configured for insertion into the perimeter curved pockets 42. In this regard, as seen in FIG. 1, the perimeter wave shaped teeth 46 and the perimeter curved pockets 42 preferably are molded in with opposite curvatures such that upon folding the tail segment up, the depressed profile elements and the raised profile elements will be oriented in opposing mirror image relation.

As best seen through reference to FIG. 7, during insertion of the tail segment 14 behind the crossbar 16, the angled face 50 of the central tooth 44 may ride in sliding relation along the surface of the tail segment 14 and will fall into and out of the depressed tail profile elements in a ratcheting manner as they move past in opposing relation. However, a sliding relation is maintained by the camming action of the angled face 50. Upon achieving a desired degree of insertion of the tail segment, a user may reversibly lock in the desired position by pressing the crossbar 16 and the tail segment 14 towards one another. This compression causes the raised crossbar profile element 38 to be matedly inserted into the opposing depressed tail profile element 36. In this regard, in the illustrated exemplary construction, the window opening surrounded by the base frame 20 may provide finger access to facilitate pressing the tail segment and the crossbar towards one another. However, the window opening may also be eliminated and replaced by a flat panel if desired such that the user may press on the crossbar to facilitate connection with the tail segment 14. It is also contemplated that the crossbar 16 and the tail segment 14 may be connected without a forced pressing action if the raised crossbar profile element 38 projects a sufficient distance away from the crossbar 16 to extend into the interior of depressed tail profile element 36. In the inserted condition, the withdrawal of the tail segment by application of tensioning force is blocked by the upper ledge surface 48. However, the tail segment 14 may be disengaged from the crossbar 16 by reversing the compressive engagement between the raised crossbar profile element 38 and the central pocket 40. Moreover, this disengagement may typically be carried out using one hand by pulling up on the distal end 32.

As will be appreciated, the polymeric materials forming the attachment strap 10 are substantially pliable. In one exemplary embodiment, the tail profile elements may be sized to facilitate a relatively tight, yet reversible press-fit relationship. In this regard, the rigidity of the polymeric material forming the tail segment may be such that the pockets can expansively deform as the crossbar profile element 38 is inserted. The tail segment 14 may be disengaged from the crossbar 16 by reversing the compressive engagement between the raised crossbar profile element 38 and the central pocket 40.

As shown, in the exemplary construction the tail profile elements 36 and the crossbar profile element 38 are disposed on the same side of the attachment strap 10. Thus, when the tail segment 14 is passed under the crossbar 16, the tail profile elements 36 and the crossbar profile element 38 are in opposing, facing relation to one another such that they may be pressed together. The tail profile elements 36 and the crossbar profile element 38 may be pulled apart relatively easily by application of shear force without the need for tools but will remain substantially stable when subjected to tension. In this regard, it is believed that the configuration incorporating a central tooth 44 with perimeter wave-shaped teeth 46 may be particularly beneficial in providing tension strength.

Due to the presence of multiple tail profile elements 36 arranged in stacked linear series, the attachment strap 10 is highly adjustable to a variety of effective diameters. Thus, it may find applicability in numerous environments of use to attach both large and small items. Moreover, the tail profile elements 36 may be numbered or otherwise designated with unique identifiers (FIG. 2). Such identification facilitates a consistent degree of tightening when using multiple straps. That is, each of the straps can be tightened to the same degree by reference to the numbering system. Moreover, as best seen in FIGS. 1 and 2, one or more holes 54 may be present along the length of the strap segment 14. In practice, the holes 54 may be used as connection points for other elements such as tools or the like that can hang from the attachment strap if desired.

As previously noted, the combination of the raised profile central tooth 44 and perimeter wave-shaped teeth 66 on the crossbar 16 with complementary depressed tail profile elements 36 is believed to provide excellent connective properties. However, any number of other tooth and pocket configurations may likewise be used.

Figure 8:
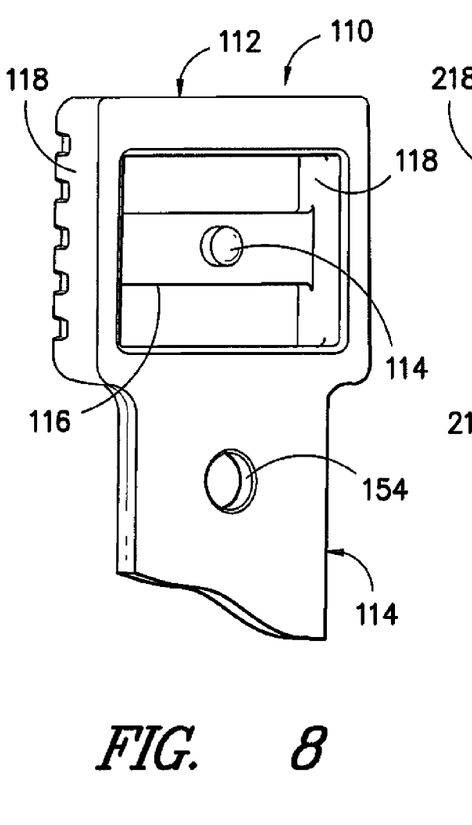
FIG. 8 illustrates the back side of an exemplary alternative attachment head construction for an exemplary attachment strap consistent with the present disclosure.

By way of example only, and not limitation, FIG. 8 illustrates an alternative attachment strap 110 wherein like elements to those described previously are designated by like reference numerals within a 100 series. As shown, the attachment strap 110 incorporates a crossbar 116 having a single generally cylindrical tooth 144 for engagement with complementary pockets (not shown) of mating geometry.

Figure 9:
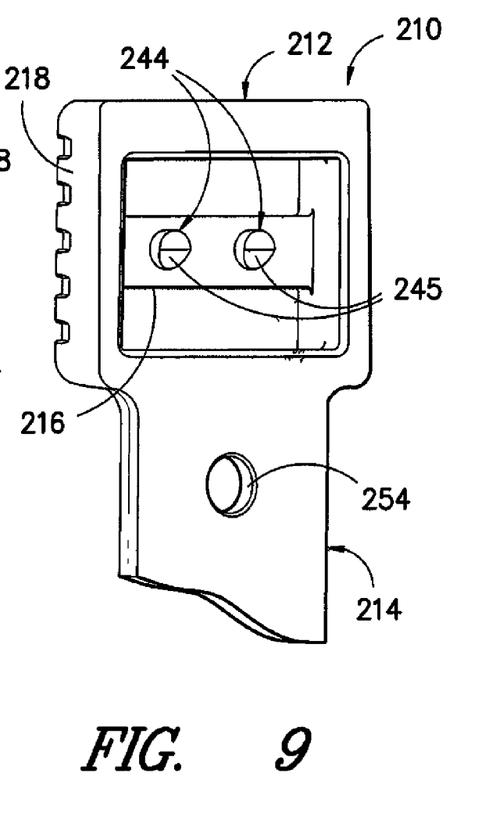
FIG. 9 illustrates the back side of an exemplary alternative attachment head construction for an exemplary attachment strap consistent with the present disclosure.

FIG. 9 illustrates an alternative attachment strap 210 wherein like elements to those described previously are designated by like reference numerals within a 200 series. As shown, the attachment strap 210 incorporates a crossbar 216 having a pair of spaced-apart teeth 244 with angled faces 245 for engagement with complementary pockets (not shown) of mating geometry in the tail segment 214.

Figure 10:
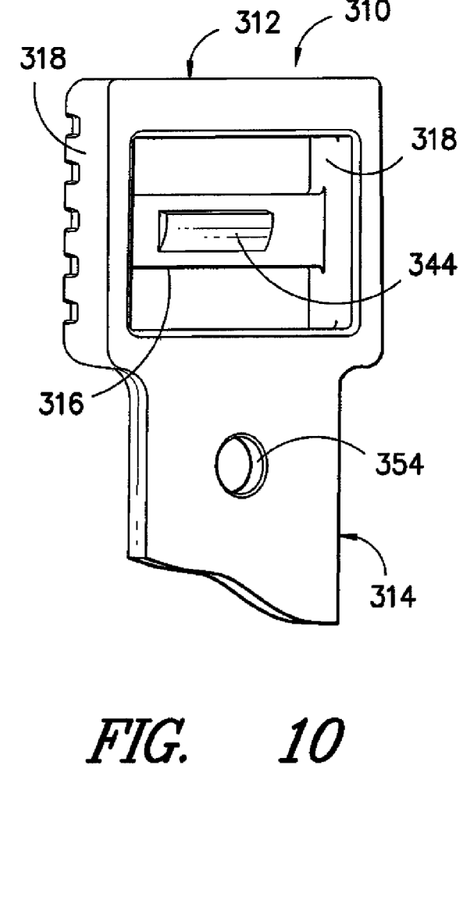
FIG. 10 illustrates the back side of an exemplary alternative attachment head construction for an exemplary attachment strap consistent with the present disclosure.

FIG. 10 illustrates an alternative attachment strap 310 wherein like elements to those described previously are designated by like reference numerals within a 300 series. As shown, the attachment strap 310 incorporates a crossbar 316 having a single central tooth 344 of pyramidal geometry similar to the central tooth 34 for engagement with complementary pockets (not shown) of mating geometry in the tail segment 314.

Figure 11:
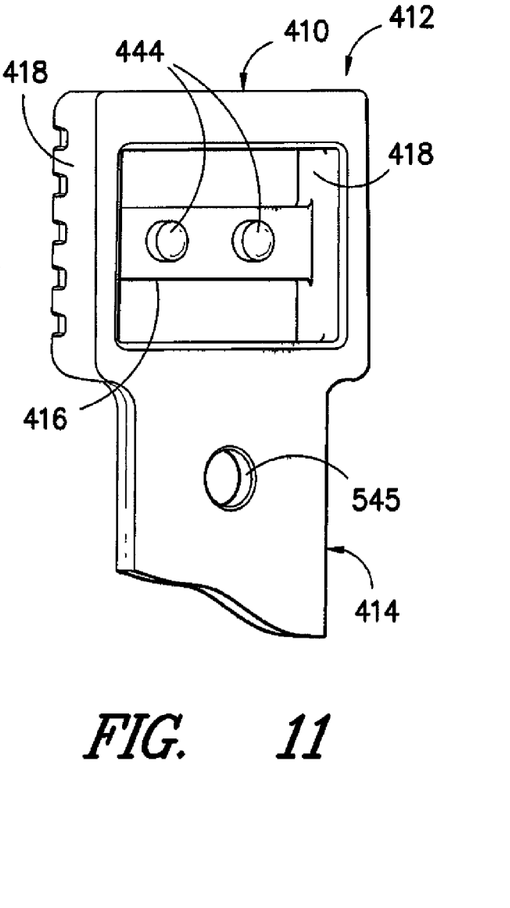
FIG. 11 illustrates the back side of another exemplary alternative attachment head construction for an exemplary attachment strap consistent with the present disclosure.

FIG. 11 illustrates an alternative attachment strap 410 wherein like elements to those described previously are designated by like reference numerals within a 400 series. As shown, the attachment strap 410 incorporates a crossbar 416 having a pair of spaced-apart substantially cylindrical teeth 444 for engagement with complementary pockets (not shown) of mating geometry in the tail segment 414.

Figure 12:
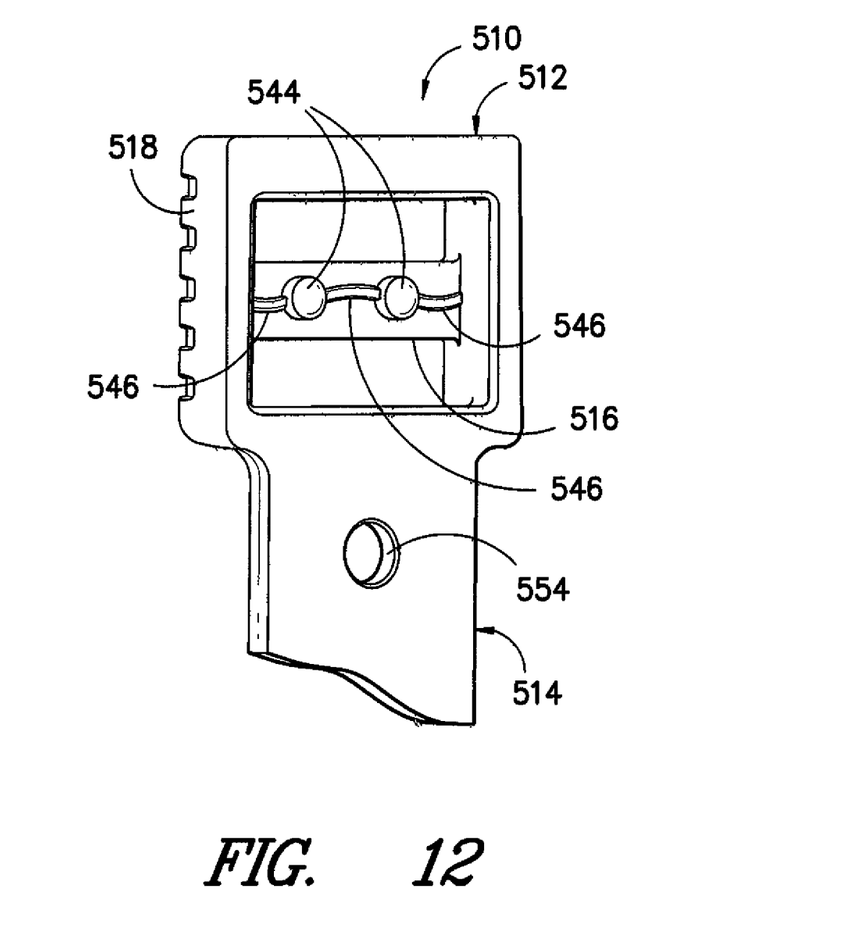
FIG. 12 illustrates the back side of yet another exemplary alternative attachment head construction for an exemplary attachment strap consistent with the present disclosure.

FIG. 12 illustrates yet another alternative attachment strap 510 wherein like elements to those described previously are designated by like reference numerals within a 500 series. As shown, the attachment strap 510 incorporates a crossbar 516 having a pair of spaced-apart teeth 544 with wave-shaped teeth 536 extending between the teeth 534 and outwardly away from the teeth 534 for engagement with complementary pockets (not shown) of mating geometry in the tail segment 514.

Of course, variations and modifications of the foregoing are within the scope of the present disclosure. All dimensions are merely exemplary. Thus, it is to be understood that the disclosure disclosed and defined herein extends to all alternative combinations of two or more of the individual features mentioned or evident from the text and/or drawings. All of these different combinations constitute various alternative aspects of the present disclosure.

Various features of the invention are set forth in the following claims.

What is claimed is:

1. An attachment strap of elongated geometry adapted for insertion through a webbing loop on a base article worn by a user, the attachment strap comprising:
    a polymeric molded attachment head including a base frame with a pair of lateral sidewalls projecting in raised relation away from the base frame, the attachment head including a crossbar extending between the lateral sidewalls in raised relation to the base frame such that there is a space between the crossbar and the base frame, wherein the crossbar includes at least one raised or depressed crossbar profile element oriented in facing relation towards the base frame;
    a pliable tail segment of polymeric molded construction extending away from the attachment head, the tail segment being foldable upon itself to form a loop, the tail segment including a distal portion adapted for sliding insertion under the crossbar and between the lateral sidewalls such that the distal portion of the tail segment is disposed between the crossbar and the base frame, wherein the distal portion of the tail segment includes a stacked series of spaced apart raised or depressed tail segment profile elements facing in the same direction as the crossbar profile element when the tail segment is in a flat unfolded condition, at least a plurality of the tail segment profile elements having a geometry complementary to the crossbar profile element and being mateable in reversible press-fit inserted relation to the crossbar profile element such that the distal portion of the tail segment may be held in place relative to the crossbar following sliding insertion of the distal portion under the crossbar, and wherein either the crossbar profile element or tail segment profile elements are expansively deformed during press-fit mateable engagement between the crossbar profile element and tail segment profile elements.

2. The attachment strap as recited in claim 1, wherein the attachment head and tail segment are molded integrally as a unitary construction.

3. The attachment strap as recited in claim 1, wherein the base frame surrounds a window opening, the window opening being in spaced apart relation to the crossbar.

4. The attachment strap as recited in claim 1, wherein the tail segment includes a foldable loop-forming segment of reduced thickness relative to the distal portion of the tail segment.

5. The attachment strap as recited in claim 1, wherein the crossbar profile element includes at least one tooth having a substantially trapezoidal cross section including an upper ledge surface projecting away from the surface of the crossbar and an angled face extending downwardly from the upper ledge surface.

6. The attachment strap as recited in claim 5, wherein the crossbar profile element further includes perimeter wave shaped teeth extending away from lateral sides of the central tooth towards the lateral sidewalls.

7. The attachment strap as recited in claim 6, wherein the tail segment profile elements each include a central pocket adapted to matedly engage said at least one tooth in press-fit relation and a pair of perimeter curved pockets intersecting the central pocket adapted to matedly engage the perimeter wave shaped teeth in press-fit relation.

8. The attachment strap as recited in claim 7, wherein the perimeter wave shaped teeth have substantially hemispherical cross sections and a concave arc curvature pattern defining a curve with the apex of the curve below the ends of the curve.

9. The attachment strap as recited in claim 1, wherein the tail segment includes a plurality of holes extending through the tail segment.

10. The attachment strap as recited in claim 1, wherein the distal portion of the tail segment includes a molded-in lead-in tab of reduced width relative to an adjacent portion of the tail segment.

11. An attachment strap of elongated geometry adapted for insertion through a webbing loop on a base article worn by a user, the attachment strap comprising:
    a polymeric molded attachment head including a base frame with a pair of lateral sidewalls projecting in raised relation away from the base frame, the attachment head including a crossbar extending between the lateral sidewalls in raised relation to the base frame such that there is a space between the crossbar and the base frame, wherein the crossbar includes a molded in crossbar profile element of raised profile oriented in facing relation towards the base frame such that the crossbar profile element projects at least partially across the space between the crossbar and the base frame, the crossbar profile element including at least one tooth having a substantially trapezoidal cross section including an upper ledge surface projecting away from the surface of the crossbar and an angled face extending downwardly from the upper ledge surface;
    a pliable tail segment of polymeric molded construction extending away from the attachment head, the tail segment being foldable upon itself to form a loop, the tail segment including a distal portion adapted for sliding insertion under the crossbar and between the lateral sidewalls such that the distal portion of the tail segment is disposed between the crossbar and the base frame, wherein the distal portion of the tail segment includes a stacked series of molded in, spaced apart tail segment profile elements of depressed profile facing in the same direction as the crossbar profile element when the tail segment is in a flat unfolded condition, at least a plurality of the tail segment profile elements having a pocket adapted to matedly engage the at least one tooth in reversible press-fit inserted relation such that the distal portion of the tail segment may be held in place relative to the crossbar following sliding insertion of the distal portion under the crossbar, and wherein each of the tail segment profile elements is adapted to expansively deform during press-fit mateable engagement with the crossbar profile element.

12. The attachment strap as recited in claim 11, wherein the attachment head and tail segment are molded integrally as a unitary construction.

13. The attachment strap as recited in claim 11, wherein the base frame surrounds a window opening, the window opening being in spaced apart relation to the crossbar.

14. The attachment strap as recited in claim 11, wherein the tail segment includes a foldable loop-forming segment of reduced thickness relative to the distal portion of the tail segment.

15. The attachment strap as recited in claim 11, wherein the crossbar profile element further includes perimeter wave shaped teeth extending away from lateral sides of the central tooth towards the lateral sidewalls.

16. The attachment strap as recited in claim 15, wherein the tail segment profile elements each include a central pocket adapted to matedly engage said at least one tooth in press-fit relation and a pair of perimeter curved pockets intersecting the central pocket adapted to matedly engage the perimeter wave shaped teeth in press-fit relation.

17. The attachment strap as recited in claim 16, wherein the perimeter wave shaped teeth have substantially hemispherical cross sections and a concave arc curvature pattern defining a curve with the apex of the curve below the ends of the curve.

18. The attachment strap as recited in claim 11, wherein the tail segment includes a plurality of holes extending through the tail segment at a position adjacent to the attachment head.

19. The attachment strap as recited in claim 11, wherein the distal portion of the tail segment includes a molded-in lead-in tab of reduced width relative to an adjacent portion of the tail segment.

20. An attachment strap of elongated geometry adapted for insertion through a webbing loop on a base article worn by a user, the attachment strap comprising:

a polymeric molded attachment head including a base frame surrounding a window opening with a pair of lateral sidewalls projecting in raised relation away from the base frame, the attachment head including a crossbar extending between the lateral sidewalls in raised relation to the base frame such that there is a space between the crossbar and the window opening, wherein the crossbar includes a molded in crossbar profile element of raised profile oriented in facing relation towards the window opening such that the crossbar profile element projects at least partially across the space between the crossbar and the base frame, the crossbar profile element including a central tooth with perimeter wave shaped teeth extending away from lateral sides of the central tooth towards the lateral sidewalls, the central tooth having a substantially trapezoidal cross section including an upper ledge surface projecting away from the surface of the crossbar and an angled face extending downwardly from the upper ledge surface, the perimeter wave shaped teeth having substantially hemispherical cross sections and having a concave arc curvature pattern defining a curve with the apex of the curve below the ends of the curve;

a pliable tail segment of polymeric molded construction molded integrally with the attachment head and extending away from the attachment head, the tail segment being foldable upon itself to form a loop, the tail segment including a distal portion adapted for sliding insertion under the crossbar and between the lateral sidewalls such that the distal portion of the tail segment is disposed between the crossbar and the base frame, wherein the distal portion of the tail segment includes a stacked series of spaced apart integral tail segment profile elements of depressed profile facing in the same direction as the crossbar profile element when the tail segment is in a flat unfolded condition, the tail segment profile elements each having a central pocket adapted to matedly engage the central tooth in press-fit relation and a pair of perimeter curved pockets adapted to matedly engage the perimeter wave shaped teeth in reversible press-fit relation such that the distal portion of the tail segment may be held in place relative to the crossbar following sliding insertion of the distal portion under the crossbar.

\* \* \* \* \*